US012244989B2

(12) United States Patent
Shiwaku

(10) Patent No.: US 12,244,989 B2
(45) Date of Patent: Mar. 4, 2025

(54) HEADPHONE STRUCTURE

(71) Applicant: Audio-Technica Corporation, Tokyo (JP)

(72) Inventor: Nonomi Shiwaku, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 89 days.

(21) Appl. No.: 17/851,256

(22) Filed: Jun. 28, 2022

(65) Prior Publication Data

US 2023/0011116 A1 Jan. 12, 2023

(30) Foreign Application Priority Data

Jul. 7, 2021 (JP) ................................ 2021-112985

(51) Int. Cl.
*H04R 1/10* (2006.01)
*H04R 1/02* (2006.01)

(52) U.S. Cl.
CPC ........... *H04R 1/1008* (2013.01); *H04R 1/025* (2013.01)

(58) Field of Classification Search
CPC .............. H04R 1/1008; H04R 2201/10; H04R 2460/09; H04R 2460/11
See application file for complete search history.

(56) References Cited

U.S. PATENT DOCUMENTS 5,729,605 A * 3/1998 Bobisuthi ............ H04R 1/1041 379/433.02
7,162,051 B2 * 1/2007 Grell .................... H04R 1/2842 381/372
8,111,858 B2 * 2/2012 Sapiejewski ......... H04R 1/1083 381/372
9,301,041 B2 * 3/2016 Narayan .............. H04R 1/1083
9,426,555 B2 * 8/2016 Yamamoto ........... H04R 1/1008
9,445,182 B2 * 9/2016 Pizzaro ................ H04R 1/1008
9,591,406 B1 * 3/2017 Huang ................. H04R 1/2807
9,854,352 B2 * 12/2017 Huang ................. H04R 1/2896
10,028,048 B2 * 7/2018 Ozawa ................. H04R 1/2819
10,154,335 B1 * 12/2018 Hoang ................. H04R 1/1008
10,484,772 B2 * 11/2019 Barrieau .............. H04R 1/1008
10,911,855 B2 * 2/2021 Tiscareno .............. H04R 9/063
11,678,104 B2 * 6/2023 Hansen ................ H04R 1/1008 381/372
11,924,599 B2 * 3/2024 Kuraoka .............. H04R 1/1008
2009/0180657 A1 * 7/2009 Isvan ................... H04R 1/2849 381/371
2011/0188696 A1 * 8/2011 Kimura ................ H04R 1/1008 381/378

(Continued)

FOREIGN PATENT DOCUMENTS

CN 109640211 A * 4/2019 ........... H04R 1/1083
GB 2538432 A * 11/2016 ........... B81B 7/0061

(Continued)

*Primary Examiner* — Ryan Robinson
(74) *Attorney, Agent, or Firm* — WC&F IP

(57) ABSTRACT

A headphone structure includes a driver unit; a baffle plate that holds the driver unit and has an acoustic hole through which a sound generated by the driver unit passes; an acoustic member disposed on a position closer to an outer edge of the baffle plate than the acoustic hole in the baffle plate; and an ear pad disposed on a surface of the acoustic member opposite to a surface that contacts the baffle plate.

11 Claims, 13 Drawing Sheets

(56) References Cited

U.S. PATENT DOCUMENTS

| | | | | |
|---|---|---|---|---|
| 2015/0092976 | A1* | 4/2015 | Kirsch | H04R 1/1058 381/371 |
| 2018/0103309 | A1 | 4/2018 | Ozawa | |
| 2022/0103930 | A1* | 3/2022 | Zhang | H04R 1/023 |

FOREIGN PATENT DOCUMENTS

| | | | | | |
|---|---|---|---|---|---|
| JP | 2013042382 | A | | 2/2013 | |
| JP | 2019149690 | A | * | 9/2019 | |
| JP | 2022171330 | A | * | 11/2022 | H04R 1/1008 |

* cited by examiner

HEADPHONE STRUCTURE

CROSS-REFERENCE TO RELATED APPLICATIONS

The present application claims priority to Japanese Patent Applications number 2021-112985, filed on Jul. 7, 2021. The contents of this application are incorporated herein by reference in their entirety.

BACKGROUND OF THE INVENTION

Conventionally, a headphone in which a mounting member for mounting an ear pad is provided on a baffle plate is known. Japanese Unexamined Patent Application Publication No. 2019-149690 discloses a headphone in which a plurality of mounting members are provided at positions between a plurality of acoustic holes arranged in a circle. The acoustic holes form a filter necessary for adjusting sound quality.

When the user wears a headphone on his/her head, an ear cap of the headphone is pressed against the user's temporal region, and the ear pad is compressed by lateral pressure. Therefore, in the conventional structure, the ear pad is pressed toward a baffle member in places where the mounting members are not provided. Therefore, there is a problem that acoustic characteristics are changed due to the acoustic holes being partially closed by the ear pad.

BRIEF SUMMARY OF THE INVENTION

This invention focuses on this point, and its object is to suppress a change in acoustic characteristics of a headphone due to an ear pad being pressed.

A headphone structure according to an aspect of the present disclosure includes: a driver unit; a baffle plate that holds the driver unit and has an acoustic hole through which a sound generated by the driver unit passes; an acoustic member disposed at a position closer to an outer edge of the baffle plate than the acoustic hole in the baffle plate; and an ear pad disposed on a surface of the acoustic member opposite to a surface that contacts the baffle plate.

DETAILED DESCRIPTION OF THE INVENTION

Outline of the Embodiment

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Figure 1:
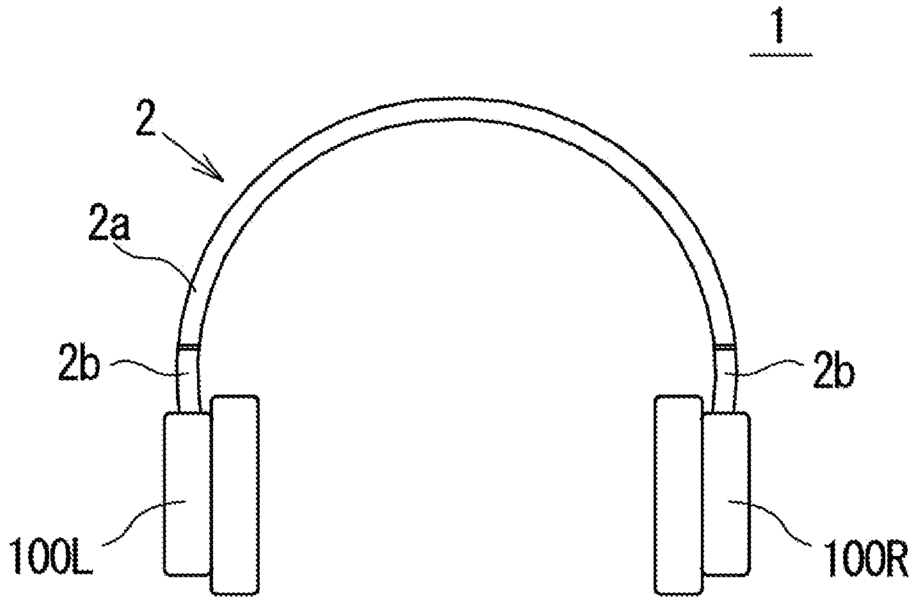
FIG. 1 is a schematic diagram showing a schematic structure of a whole headphone structure.
Figure 2:
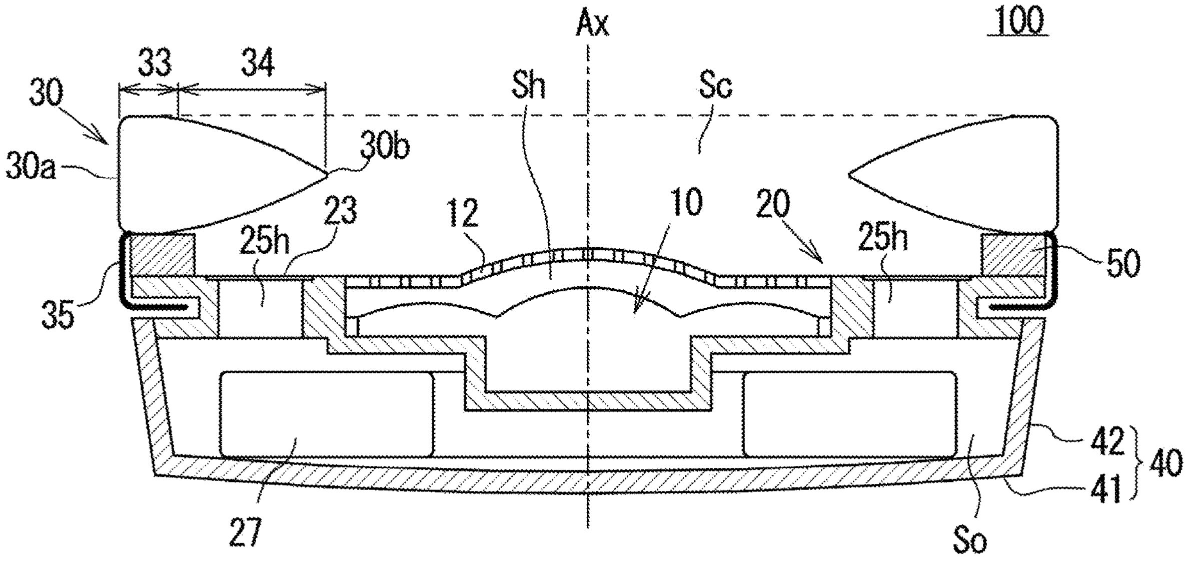
FIG. 2 is a cross-sectional view of an ear cup of a headphone according to the embodiment.
Figure 3:
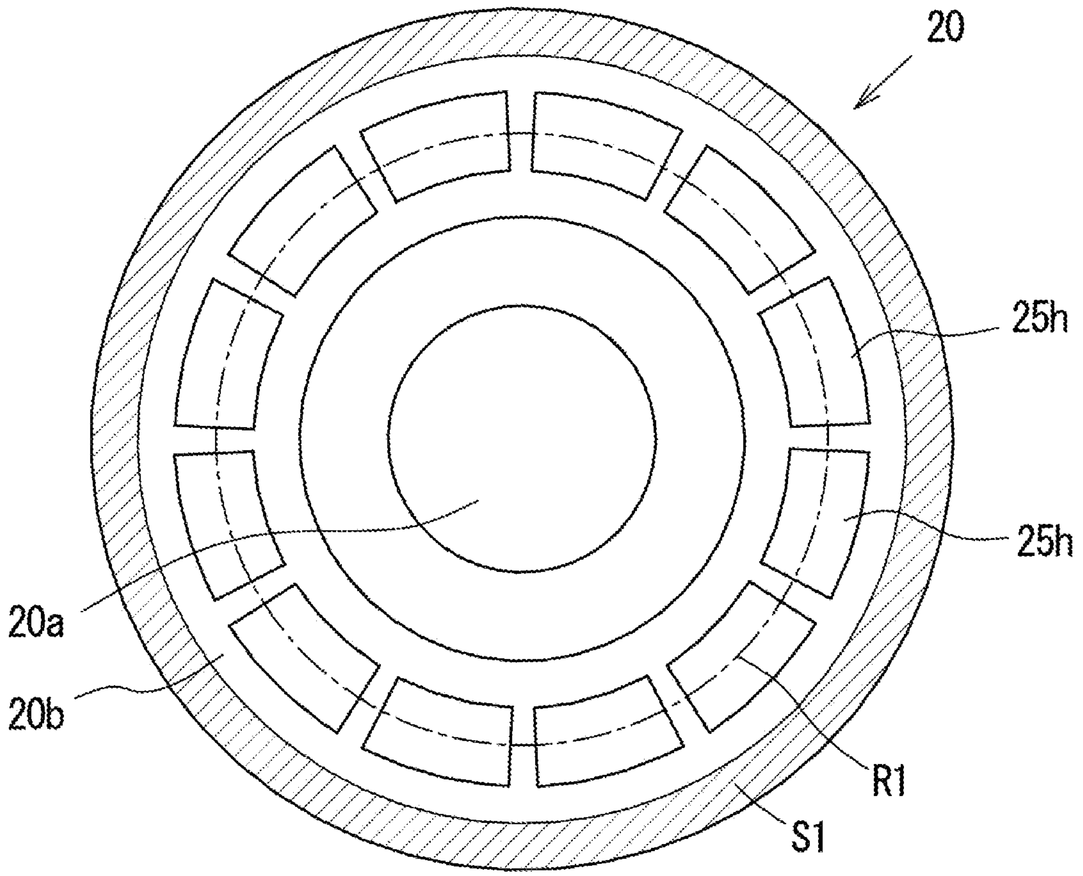
FIG. 3 shows a baffle plate of the ear cup of FIG. 2 (viewed from the side facing a user's temporal region when the headphone structure is worn).
Figure 4:
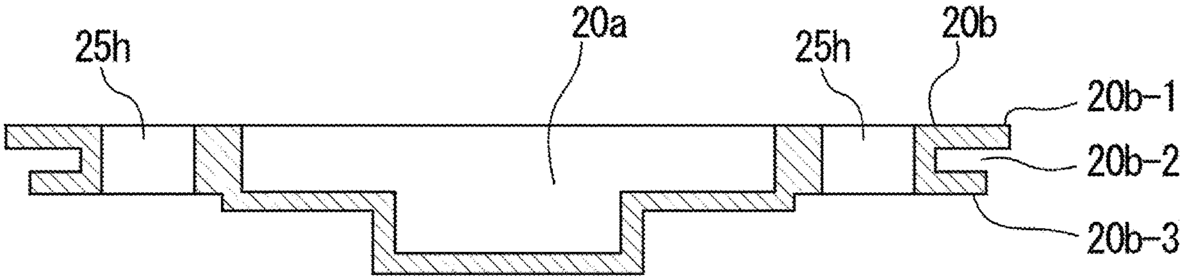
FIG. 4 is a cross-sectional view showing only the baffle plate of FIG. 3.

Hereinafter, various types of headphone ear cups according to the present embodiment will be described. FIG. 1 schematically shows a schematic structure of a whole headphone structure. FIG. 2 is a cross-sectional view of an ear cup of a headphone according to the embodiment. FIG. 3 shows a baffle plate of the ear cup of FIG. 2. FIG. 4 is a cross-sectional view showing only the baffle plate of FIG. 3.

As shown in FIG. 1, a headphone structure 1 according to the present embodiment includes a headband 2, an ear cup 100R for the right ear, and an ear cup 100L for the left ear. The ear cup 100R and the ear cup 100L are attached to the right end and the left end of the headband 2, respectively. The headband 2 includes an approximately arc-shaped body member 2*a* and two hanger members 2*b*. The hanger members 2*b* are configured such that they can be pulled out from the ends of the body member 2*a* by a predetermined length. When the user uses the headphone structure 1, the headphone structure 1 is worn on the head of the user and each ear cup 100R and 100L (hereinafter, simply referred to as the "ear cup 100") is pressed against the temporal region of the user by elastic force of the headband 2.

Terms that indicate directions such as "upward" and "downward" are used in the following description. These terms correspond to the directions in the drawing. Also, taking usage of the headphone structure into consideration, terms such as "inner side" and "outer side" are used. The "inner side" corresponds to the side that faces the user's temporal region when the headphone structure is worn, and the "outer side" corresponds to the opposite side thereof.

As shown in FIGS. 2 and 3, the ear cup 100 is an electroacoustic transducer that includes a driver unit 10, a protection plate 12, a baffle plate 20, an acoustic resistance member 23, an absorbent member 27, an ear pad 30, an extending part 35, a housing 40, and an acoustic member 50. One of the characteristics of the ear cup 100 of the present embodiment is that the acoustic member 50 is disposed between the ear pad 30 and the baffle plate 20. Details of the acoustic member 50 will be described below.

The driver unit 10 converts an electric signal to a sound. A conventionally known driver unit may be used as the driver unit 10. The driver unit 10 may also be the one described below, for example. The driver unit 10 is a dynamic driver unit, as an example. The driver unit 10 includes a driving unit and a diaphragm (not shown). The driving unit is driven (vibrated) by electromagnetic induction based on an electric signal to vibrate the diaphragm. The diaphragm is vibrated by vibrations of the driving unit, and a sound is generated from the driver unit 10 by vibrations of the diaphragm.

The protection plate 12 is a member for protecting components of the driver unit 10. The protection plate 12 covers the driver unit 10.

FIG. 2 shows an acoustic space Sc, an acoustic space Sh, and an acoustic space So of the ear cup 100. The acoustic space Sc is a closed space surrounded by the protection plate 12, the baffle plate 20, the ear pad 30, the acoustic member 50, and the user's temporal region when the headphone structure 1 is worn on the head of the user. The acoustic space Sh is a closed space between the diaphragm of the driver unit 10 and the protection plate 12. The acoustic space So is a closed space surrounded by the driver unit 10, the baffle plate 20, and the housing 40. The volumes of the acoustic spaces Sc and So affect vibration characteristics of the driver unit 10 (in other words, characteristics of the headphone structure 1). An acoustic equivalent circuit relating to the acoustic space Sc and the acoustic space Sh will be described later by referring to other figures.

The absorbent member 27 absorbs acoustic vibrations of the diaphragm in the acoustic space So. The absorbent member 27 is disposed on the back side (downward in the drawing) of the baffle plate 20.

The baffle plate 20 is a member for holding the driver unit 10. Although the term "plate" is used, the member does not necessary take the shape of a flat plate. Also, an expression such as "a plate thickness direction of the baffle plate" used in the present specification corresponds to a vertical direction along an axis Ax in FIG. 2. "Upward" in the drawings is a direction that opposes the user's temporal region side when the headphone structure is worn on the head of the user. A detailed structure of the baffle plate 20 will be described later.

The ear pad 30 is a ring-shaped elastic member surrounding the ear of the user, for example. The ear pad 30 functions as a shock absorbing member between the ear cup 100 and the user's temporal region. The ear pad 30 is pressed against the user's temporal region by elastic force from the headband 2.

Although not shown, the ear pad 30 may include a ring-shaped cushion member and a cover member that encloses the cushion member. The cushion member is made up of urethane foam or the like, for example. The cover member is made up of a material such as soft leather or the like.

The cross-sectional shape of the ear pad 30 is not limited to a particular shape. In the ear pad 30 of FIG. 2, the ear pad 30 takes the shape of a slightly vertically long triangle which is laid on its side in this example. The cross-sectional shape of the ear pad 30 may be any other shape such as a rectangular shape or the like, for example. The ear pad 30 has an outer peripheral side portion 33 and an inner portion 34. The outer peripheral side portion 33 of the ear pad 30 is supported on the acoustic member 50. Specifically, the ear pad 30 is fixed in such a manner that a lower surface of the outer peripheral side portion 33 is in contact with a second surface 52, which is an upper surface of the acoustic member 50 (see below for details). The inner portion 34 extends radially inward from the outer peripheral side portion 33. A thickness of the inner portion 34 becomes gradually smaller toward the inside in a radial direction. In the ear pad 30 having such a shape, the inner portion 34 deforms toward the baffle plate 20 when the headphone structure 1 is worn on the head of the user. More specifically, the inner portion 34 deforms such that it comes closer to acoustic holes 25*h*.

The present invention is effective for an ear cup which has no acoustic member 50, in which the deformed ear pad reduces an effective area of acoustic holes. That is, the present invention is most effective in a headphone configuration in which the effective areas of the acoustic holes are reduced due to deformation of the ear pad.

An outer peripheral surface 30*a* of the ear pad 30 is situated at approximately the same place as an outer peripheral part of the baffle plate 20 in the radial direction, for example. On the other hand, an inner peripheral part 30*b* of the ear pad 30 is situated such that it is radially inside the acoustic holes 25*h* (described in detail below) of the baffle plate 20. In other words, in the present embodiment, the ear pad 30 is formed in a shape such that the ear pad 30 and the acoustic holes 25*h* overlap when projected in the plate thickness direction (the vertical direction in FIG. 2) of the baffle plate 20.

In the present embodiment, the ear pad 30 has a shape (a shape in which the acoustic holes 25*h* are completely overlapped by the ear pad 30 as viewed in a projection) that entirely overlaps the acoustic holes 25*h*, but the present invention is not limited to such a configuration. As an example, the ear pad 30 may have a shape such that the acoustic holes 25*h* are overlapped partially by the ear pad 30 in the vertically projected view. The ear pad 30 has an extending part 35, which is a flap, extending from a part of the cover member toward the baffle plate 20. The extending part 35 is a portion for fixing the ear pad 30 to the baffle plate 20. For example, the extending part 35 is stretchable in both the radial direction and the plate thickness direction of the baffle plate 20. An end portion of the extending part 35 engages with an engaging part 20*b*-2 (described in detail below) formed on the baffle plate 20, thereby fixing the ear pad 30 to the baffle plate 20 with the acoustic member 50 interposed therebetween. The extending part 35 may or may not contact an outer peripheral surface of the acoustic member 50.

Since the extending part 35 has stretchability as described above, the ear pad 30 can be removed from the baffle plate 20 as needed. Further, since the extending part 35 is made of a stretchable material, the ear pad 30 can be firmly attached to the baffle plate 20 when the acoustic member 50 is replaced with another acoustic member having a different thickness because the extending part 35 stretches and contracts according to a thickness of the acoustic member 50, for example. The ear pad 30 may be bonded to the acoustic member 50.

The extending part 35 may be made of the same material as the cover member of the ear pad 30, or may be made of a different material having greater elasticity than that of the cover member of the ear pad 30. When the extending part 35 is made of the different material, the extending part 35 may be fixed to the ear pad 30 by sewing or the like, for example. The extending part 35 may be configured such that a length of a portion extending in the thickness direction of the acoustic member 50 (a portion extending in the vertical direction in FIG. 2) is longer than a natural length of said portion in a state, shown in FIG. 2, in which an end portion of the extending part 35 engages with a concave portion, which is an engaging part 20*b*-2. In this configuration, the extending part 35 stretches in the thickness direction of the acoustic member 50 so that the ear pad 30 is pressed toward the acoustic member 50 by elastic force of the extending part 35 in the state shown in FIG. 2. Thus, the ear pat 30 is fixed stably.

The housing 40 is connected to the baffle plate 20 to form the acoustic space So, and is formed of a resin material, for example. The shape of the housing 40 is not limited to a particular shape, however, and may take any shape in consideration of the design of the headphone. In this example, the housing 40 has a bottom surface part 41 and a peripheral wall 42. The bottom surface part 41 is a portion opposite to the user's temporal region when the headphone structure 1 is worn by the user. The peripheral wall 42 is an annular portion raising from the outer periphery of the bottom surface part 41. In other words, the housing 40 has a cup-like shape opening toward the head of the user.

The baffle plate 20 is attached to the housing 40 to close the opening of the housing 40. The outer shape of the baffle plate 20 may be any shape, however, and as an example, it may be circular as shown in FIG. 3. The baffle plate 20 is made of a resin material such as ABS. As can be understood from FIGS. 3 and 4, the baffle plate 20 as a whole has a flat circular shape. In this example, a unit holding part 20*a* is provided in the center part of the baffle plate 20. An annular peripheral part 20*b* is formed around the unit holding part 20*a*.

The unit holding part 20*a* is a concave portion having a shape corresponding to the shape of the driver unit 10. When the driver unit 10 is disposed in the unit holding part 20*a* as shown in FIG. 2, a position of an upper surface of the protection plate 12 of the driver unit 10 in the vertical direction is substantially the same as a position of an upper surface of the baffle plate 20.

The peripheral part 20*b* has a plurality of acoustic holes 25*h*. The acoustic holes 25*h* are through-holes that allow the acoustic space Sc and the acoustic space So to communicate with each other. In the present embodiment, each acoustic hole 25*h* is formed on a reference circle R1 along the circumferential direction, as shown in FIG. 3. The acoustic hole 25*h* takes an annular sector shape in the present embodiment. The acoustic holes 25*h* may be arranged at equal intervals, for example.

The acoustic holes 25*h* may have the same shape, but are not limited to this configuration. The plurality of acoustic holes 25*h* may include acoustic holes of different shapes. Shapes or positions of the plurality of acoustic holes 25*h* are determined on the basis of structures such as a rib, a boss, and a screw hole for connecting the baffle plate 20 to the housing 40, for example. The intervals between the plurality of adjacent acoustic holes 25*h* may be non-identical. The intervals between the plurality of acoustic holes 25*h* may be determined on the basis of the structure of the configuration for connecting the baffle plate 20 and the housing 40. An annular region S1 in FIG. 3 outside a region in which the acoustic holes 25*h* are formed is a region where the acoustic member 50, described later, is arranged.

The peripheral part 20*b* includes a flat upper surface 20*b*-1 and a lower surface 20*b*-3 that opposes the upper surface 20*b*-1, as shown in FIG. 4. Further, a concave portion is formed on the radially outer periphery of the peripheral part 20*b*. The concave portion functions as the engaging part 20*b*-2 with which the extending part 35 of the ear pad 30 engages. Alternatively, the engaging part may be formed at a part of the housing 40 instead of the baffle plate 20.

Referring to FIG. 2 again, an acoustic resistance member 23 in a sheet form is disposed on the upper surface 20*b*-1 of the baffle plate 20 such that the acoustic resistance member 23 covers each acoustic hole 25*h*. The acoustic resistance member 23 may be a ring-shaped film. A single member may be disposed to form the acoustic resistance member 23. Alternatively, a plurality of acoustic resistance members 23, each of which covers one or several acoustic holes 25*h*, may be disposed.

[Structure of the Acoustic Member 50]

Figure 5A:
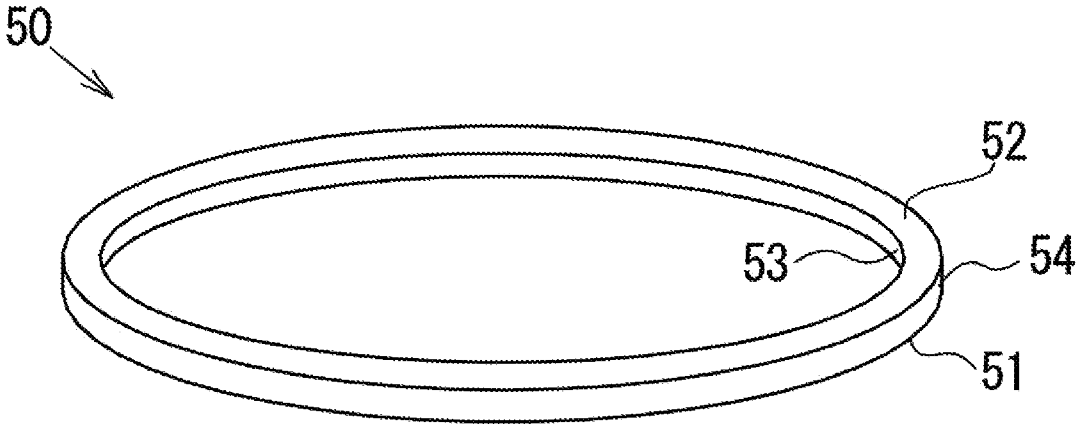
FIG. 5A is an external perspective view showing a whole acoustic member.

FIG. 5A is an external perspective view showing the whole acoustic member 50. In the ear cup 100 of the headphone structure 1 of the present embodiment, as shown in FIG. 2, an acoustic member 50 is disposed between the ear pad 30 and the baffle plate 20. The acoustic member 50 is a ring-shaped elastic member having a predetermined thickness, as shown in FIG. 5A. In particular, the acoustic member 50 has an annular shape.

The acoustic member 50 has an inner diameter which is larger than the diameter of the region where the acoustic holes 25*h* exist, so that the acoustic member 50 does not cover the acoustic holes 25*h*. In other words, the acoustic member 50 is disposed on the side closer to the outer edge of the baffle plate 20 than the acoustic holes 25*h*.

The acoustic member 50 has air permeability, for example. The air-permeable material may be a porous material in which a plurality of holes are formed. The porous material may be a foam material such as Poron (registered trademark). In the example shown in FIG. 2, the cross-sectional shape of the acoustic member 50 is rectangular. The acoustic member 50 has a first surface 51 facing the baffle plate 20, a second surface 52 facing the ear pad 30, an inner peripheral surface 53, and an outer peripheral surface 54. Each of the first surface 51 and the second surface 52 is a flat surface, for example. The thickness of the acoustic member 50 is in a range of 0.5 mm to 10 mm, for example.

Figure 5B:
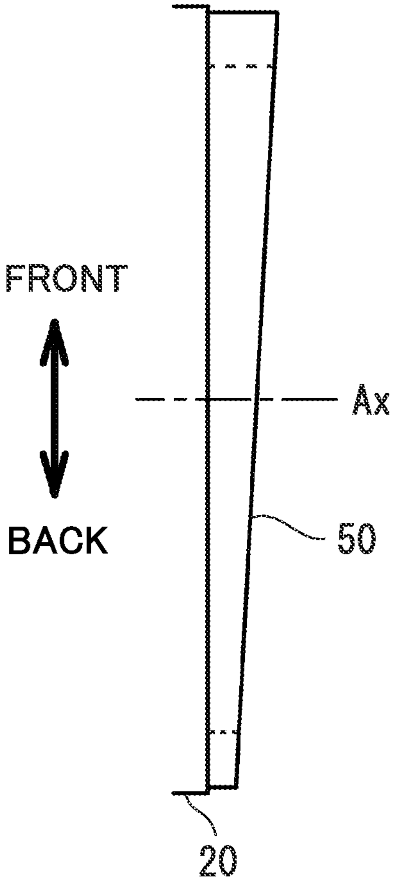
FIG. 5B shows one modification example of the acoustic member.
Figure 5C:
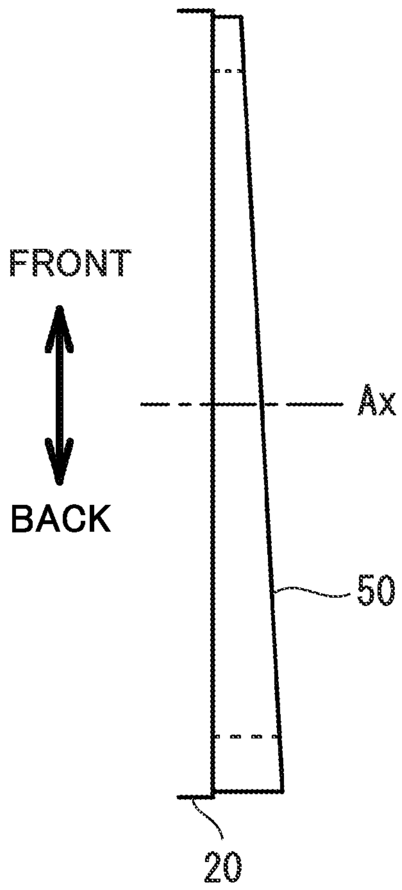
FIG. 5C shows another modification example of the acoustic member.

The thickness of the acoustic member 50 is constant over the entire member, for example. But the present invention is not limited to this configuration. The thickness of the acoustic member 50 may be inconstant. FIG. 5B shows one modification example of the acoustic member 50. FIG. 5C shows another modification example of the acoustic member 50. FIG. 5B and FIG. 5C are each a schematic diagram showing the baffle plate 20 and the acoustic member 50 viewed from the upper side of the head of the user when the headphone is worn on the user's head.

In an embodiment of the acoustic member 50 with an inconstant thickness is, as shown in FIG. 5B, a thickness of a portion of the acoustic member 50 on the user's back side may be smaller than a thickness of a portion of the acoustic member 50 on the user's front side when the headphone is worn by the user, for example. Alternatively, as shown in FIG. 5C, a thickness of a portion of the acoustic member 50 on the user's front side may be smaller than a thickness of a portion of the acoustic member 50 on the user's back side. In the configurations of FIG. 5B and FIG. 5C, the surface, on which the ear pad is disposed, of the acoustic member 50 opposite to the surface facing to the baffle plate 20 is flat, for example. With such a configuration, the ear pad is fixed stably without forming a gap between the ear pad and the acoustic member 50.

The diameter of the acoustic member 50 may be substantially the same as the diameter of the baffle plate 20 (specifically, the diameter of the upper surface 20*b*-1), for example. Such a configuration prevents a surface step between the outer peripheral surfaces of the ear pad and the acoustic member 50 from occurring. As another example, the outer shape of the acoustic member 50 may be smaller than that of the baffle plate 20. In particular, the diameter of the acoustic member 50 may be smaller than the diameter of the baffle plate 20. As an example, the diameter of the acoustic member 50 is at least 1 mm smaller than the diameter of the baffle plate 20. With such a configuration, the acoustic member 50 does not protrude outward from the baffle plate 20 even if the position of the acoustic member 50 is slightly deviated in assembling. Therefore, the acoustic member 50 is prevented from peeling off when removing the ear pad 30 due to the extending part 35 of the ear pad 30 being caught on the acoustic member 50.

The acoustic member 50 is preferably a material having air permeability. In such a configuration, the acoustic member 50 acts as a resistance component with respect to air flow. By providing the acoustic member 50, it is possible to make effective use of the acoustic holes 25*h* and the acoustic resistance member 23 disposed on the baffle plate 20 as acoustic filters having wide bandwidth. Also, when the acoustic member 50 has air permeability, the acoustic space So communicates with the external space of the ear cup 100 via the extending part 35 of the ear pad 30.

If the acoustic member 50 has no air permeability, the acoustic member 50 does not function as an acoustic resistance member. Thus, the effect of a change in acoustic capacity of the acoustic holes 25*h* on the acoustic characteristics becomes significant. On the other hand, when the acoustic member 50 has air permeability, a mechanical acoustic circuit of the ear cup 100 includes the acoustic capacity and acoustic resistance of the acoustic member 50. Thus, it is possible to suppress a change in acoustic characteristics caused by a change in the acoustic space Sc that occurs due to a change in a pressure level of the ear pad 30 when the headphone is worn. Therefore, the present invention can provide an advantage in that the difference in acoustic characteristics due to individual differences of the user is reduced.

In the present embodiment, a part of the lower surface of the ear pad 30 is in contact with the second surface 52 of the acoustic member 50. As another aspect, the acoustic member 50 may be disposed between the ear pad 30 and the baffle plate 20 with another member (not shown) interposed therebetween. Although the acoustic member 50 is bonded to the baffle plate 20 as an example, the acoustic member 50 may be detachably fixed to the baffle plate 20. As an example, the acoustic member 50 may be fixed to the baffle plate 20 by means of a convex portion and a concave portion, in which the convex portion or the concave portion formed on the acoustic member 50 couples to the concave portion or the convex portion formed on the baffle plate 20. The acoustic member 50 may be configured to be detachable from the baffle plate 20. This configuration allows the user to remove the acoustic member 50 and attach other acoustic members 50 having different thicknesses to the baffle plate 20.

[Mechanical Acoustic Circuit of the Ear Cup 100]

Figure 6:
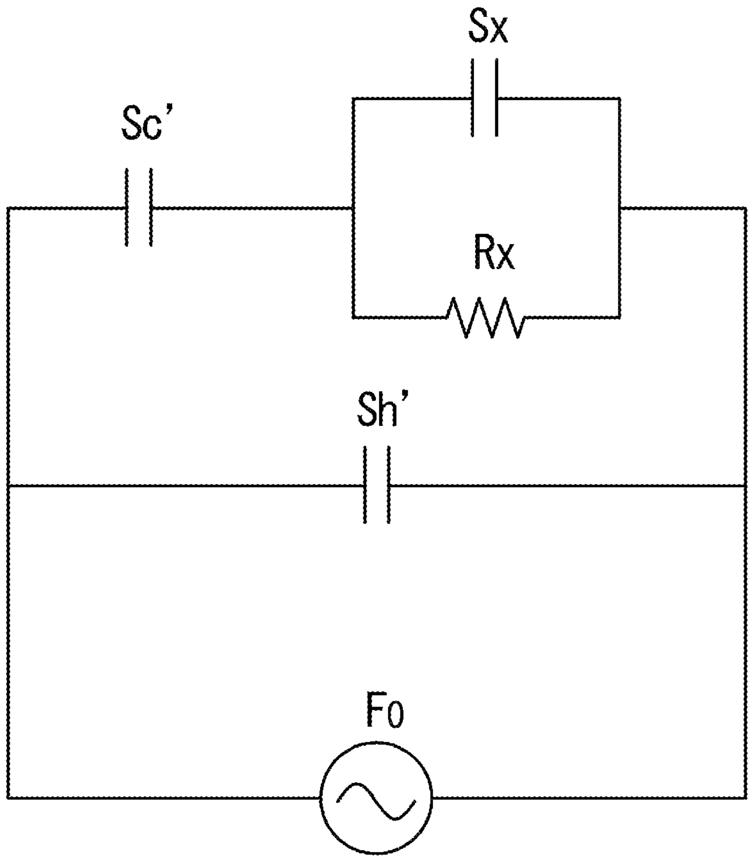
FIG. 6 is a mechanical acoustic circuit (acoustic equivalent circuit) of the ear cup of FIG. 2.

FIG. 6 shows the mechanical acoustic circuit (acoustic equivalent circuit) of the ear cup 100 of FIG. 2. Here, Sc' represents the acoustic capacity of the acoustic space Sc, Sh' represents the acoustic capacity between the diaphragm and the protection plate 12, and Fo represents vibration force of the diaphragm. In a conventional structure having no acoustic member 50, the acoustic equivalent circuit just includes the acoustic capacity Sc' and the acoustic capacity Sh' connected in parallel. In the present embodiment, however, the acoustic equivalent circuit includes the acoustic capacitance and the acoustic resistance relating the acoustic member 50 as the ear cup 100 has the acoustic member 50.

In circuits of FIG. 6, Sx is the acoustic capacity of the acoustic member 50, and Rx is the acoustic resistance of the acoustic member 50. A portion of the circuit in which the acoustic capacity Sx and the acoustic resistance Rx are connected in parallel is connected in series with the acoustic space Sc. The acoustic capacity Sx and the acoustic resistance Rx change in accordance with the thickness of the acoustic member 50. The acoustic resistance Rx changes depending on the material of the acoustic member 50.

Figure 7:
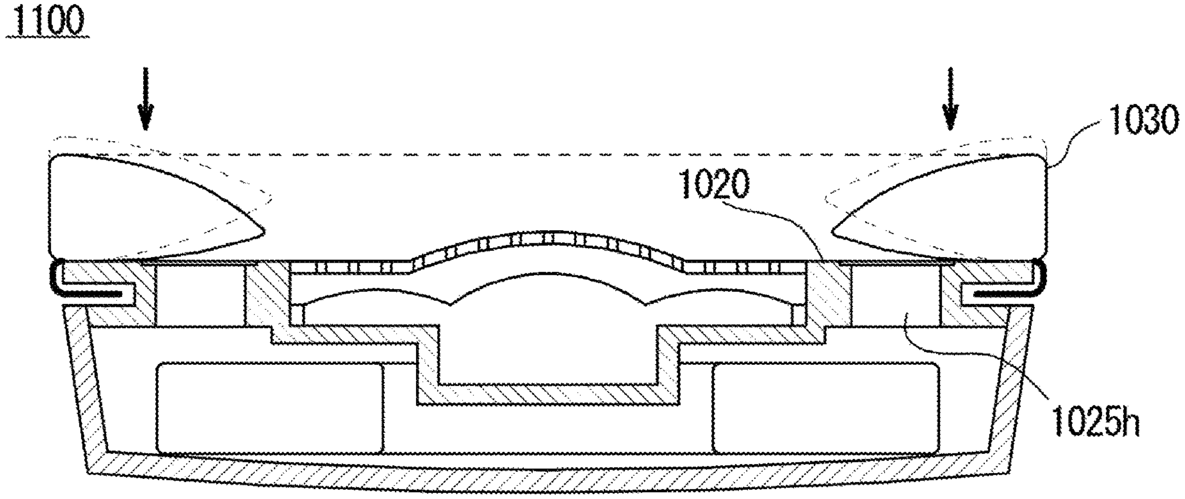
RELATED ART FIG. 7
FIG. 7 shows a deformed state of an ear pad of a conventional headphone.
Figure 8:
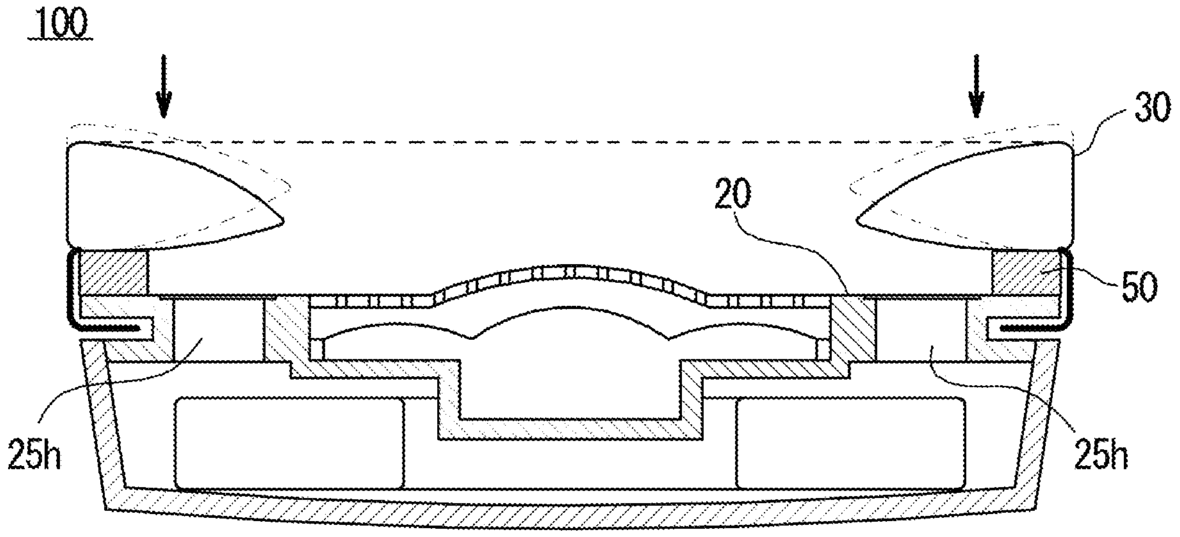
FIG. 8 shows a deformed state of the ear pad of the headphone structure according to the present embodiment.

Effects on the acoustic characteristics caused by deformation of the ear pad 30 when the headphone is worn on the user's head are as follows. Hereinafter, a description will be provided while referring to the drawings. FIG. 7 shows a state in which an ear pad is deformed in a conventional headphone. FIG. 8 shows a state in which an ear pad is deformed in the headphone according to the embodiment.

An ear cup 1100 shown in FIG. 7 has no acoustic member, an ear pad 1030 is thus directly disposed on a baffle plate 1020. Other elements are the same as the above-described configurations of the headphone of the embodiment.

In such a configuration, the ear pad 1030 is deformed to be pressed under lateral pressure from the user's temporal region when the headphone is worn on the head of the user. In particular, the ear pad 1030 extends radially inward from the outer periphery of the baffle plate 1020 and has an ear pad shape to cover acoustic holes 1025*h* in the illustrated configuration. Therefore, when the ear pad 1030 is greatly deformed, the acoustic holes 1025*h* are closed, and effective areas of the holes are reduced. Thus, significant change in acoustic characteristics may occur for each user.

In contrast, in the present embodiment, the acoustic member 50 is interposed between the ear pad 30 and the baffle plate 20 as a spacer, as shown in FIG. 8. Therefore, the acoustic holes 25*h* are not closed even when the ear pad 30 is deformed, and the effective areas of the holes are less likely to decrease. As a result, a technical effect that mechanical acoustic characteristics of the ear pad 30 become insensitive to ear pad deformation can be obtained. In consideration of such a function of the acoustic member 50, the acoustic member 50 preferably has a thickness such that the ear pad 30 (especially, the inner portion 34 shown in FIG. 2) does not cover the acoustic holes 25*h* in a state in which the ear pad 30 is compressed in the thickness direction by being pushed toward the acoustic holes 25*h* side when the headphone structure 1 is worn on the head of the user.

Further, in the present embodiment in which the acoustic member 50 is made of permeable material, air can pass though the acoustic member 50 toward outside of the ear cup 100. This makes the diaphragm of the driver unit 10 move easily even in a low frequency range. The easily moving diaphragm can improve sound quality in the auditory sense. Further, the easily moving diaphragm leads to a reduction of electrical impedance, which increases the options for design. In one aspect of the present invention, the extending part 35 (see FIG. 2) of the ear pad 30 may have air permeability.

When the acoustic member 50 has air permeability, the acoustic space So communicates with the outer space via the acoustic member 50 and the extending part 35. Therefore, change in the acoustic capacity of the front space of the baffle plate can be reduced. It is preferable that the acoustic member 50 is ring-shaped in order to prevent acoustic resistance between the acoustic space So and the outer space from being too low.

In the present embodiment, the acoustic member 50 is one of the elements constituting the acoustic space Sc. Therefore, it is possible to adjust the acoustic characteristics by changing the shape or the material of the acoustic member 50 in the present embodiment. For example, the user or a manufacturer of the headphone structure 1 can easily adjust characteristics of the acoustic member 50 serving as the acoustic resistance member by changing the material and/or the shape (e.g., the width and/or the thickness of the rectangular cross-sectional shape) of the acoustic member 50.

For example, it is possible to improve characteristics of medium-high frequency equal to or above about 600 Hz by having the user or the manufacturer appropriately change the thickness of the acoustic member 50. In terms other than acoustic characteristics, it is possible to adjust wearability of the headphone structure 1 by changing the material and/or the shape of the acoustic member 50.

According to the configuration of the present embodiment as described above, the acoustic member 50 having a predetermined thickness is disposed between the ear pad 30 and the baffle plate 20. Since the acoustic member 50 functions as a spacer, the acoustic holes 25*h* of the baffle plate 20 are less likely to be covered, even if the ear pad 30 is pressed and deformed when the user wears the headphone structure 1. As a result, a change in acoustic characteristics of the headphone structure 1 is less likely to occur. Further, since the acoustic member 50 also functions as the acoustic resistance member, it is possible to easily change the sound quality of the headphone structure 1 by changing at least one of the shape or the material of the acoustic member 50. This can eliminate a process for modifying molds to slightly change shapes of the parts in order to adjust acoustic characteristics in manufacturing of the headphone structure 1.

The acoustic member 50 provided in the ear cup 100 reduces variations in the effective area of the acoustic holes 25*h* caused by compression of the ear pad 30. As a result, the stability of frequency characteristics of the headphone structure 1 improves. Also, a difference in frequency characteristics according to the body shapes of the users who wears the headphone structure 1 can be reduced. It should be noted that an on-ear headphone has a smaller diameter than that of an over-ear headphone. Thus, the on-ear headphone is likely to be affected by a reduction of the effective area of the acoustic holes 25*h* caused by the ear pad 30 being compressed. Therefore, the configuration of the present embodiment has an effect particularly in the on-ear headphone.

[Thickness of the Acoustic Member According to a Type of Headphone]

The thickness of the acoustic member 50 may be constant or may not be constant over the entire acoustic member 50. For example, in a ring-shaped acoustic member, a thickness of a region located on the user's back side (the occipital side) when the headphone is worn by the user may be smaller than a thickness of a region on the user's front side. Ear pads of the on-ear type headphone are placed upon the pinna of the user. Therefore, if the acoustic member is thinned by an amount corresponding to a thickness of the flattened back pinna, for example, it can be expected that the wearability and sealing property of the headphone are improved.

In contrast, a thickness of the region located on the user's back side when the headphone is worn by the user may be greater than a thickness of the region on the user's front side. In the around-ear headphone (also called the over-ear headphone, which is a type of headphone that has an ear pad surrounding user's pinna), it can be expected that the wearability and the sealing property of the headphone are improved when the acoustic member is thickened by an amount corresponding to the depression part of the user's head behind the ear.

Working Example

Figure 9:
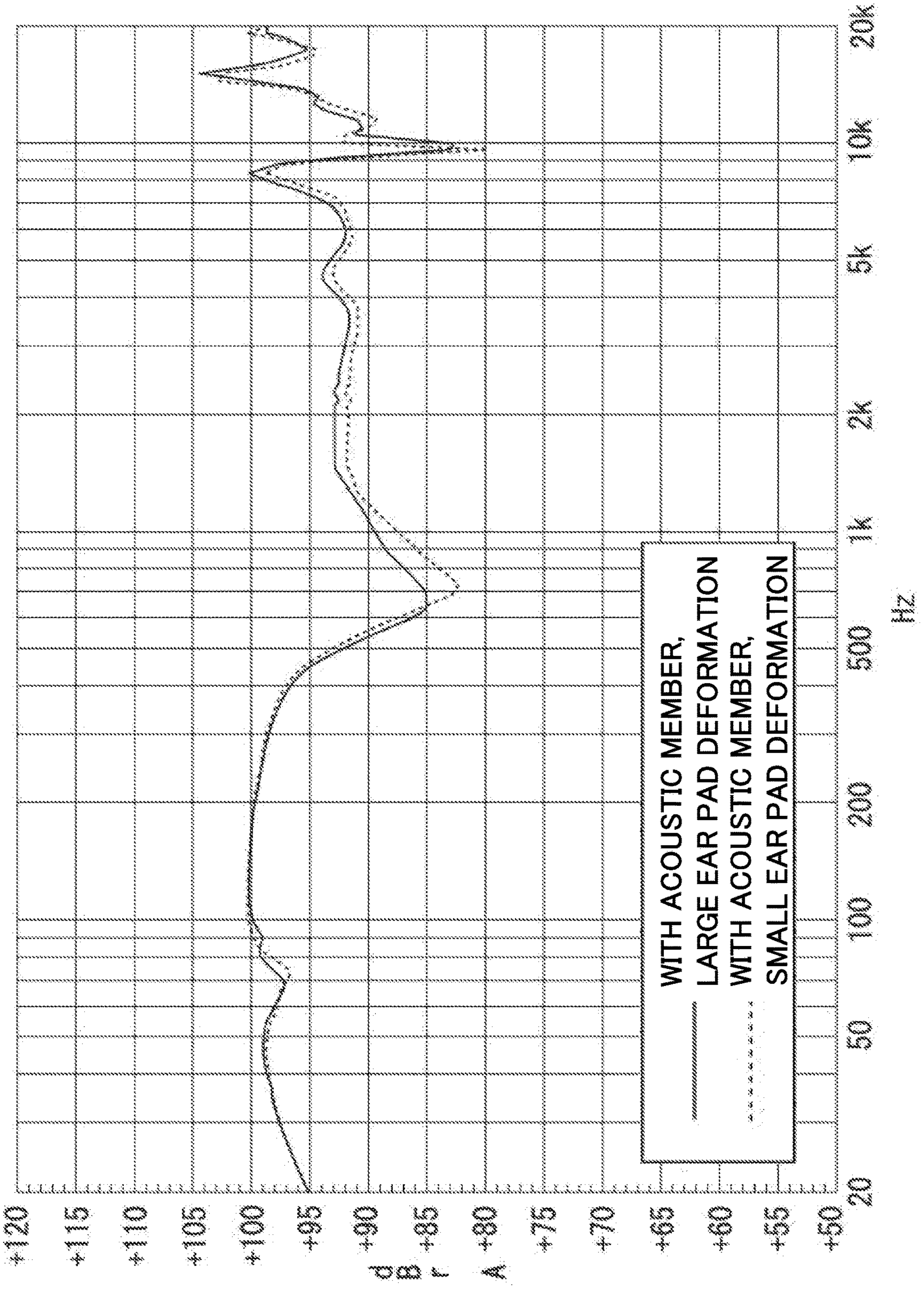
FIG. 9 shows frequency characteristics of the ear cup in the headphone structure of FIG. 1.

FIG. 9 shows frequency characteristics of the ear cup 100 in the headphone structure 1 of the present embodiment. In FIG. 9, the solid line indicates acoustic characteristics when the ear cup 100 having the acoustic member 50 is pressed against the user's temporal region with relatively high lateral pressure (that is, when an amount of deformation of the ear pad 30 is relatively large). The broken line indicates acoustic characteristics when the ear cup 100 having the acoustic member 50 is pressed against the user's temporal region with relatively low lateral pressure (that is, when the amount of deformation of the ear pad 30 is relatively small).

Figure 10:
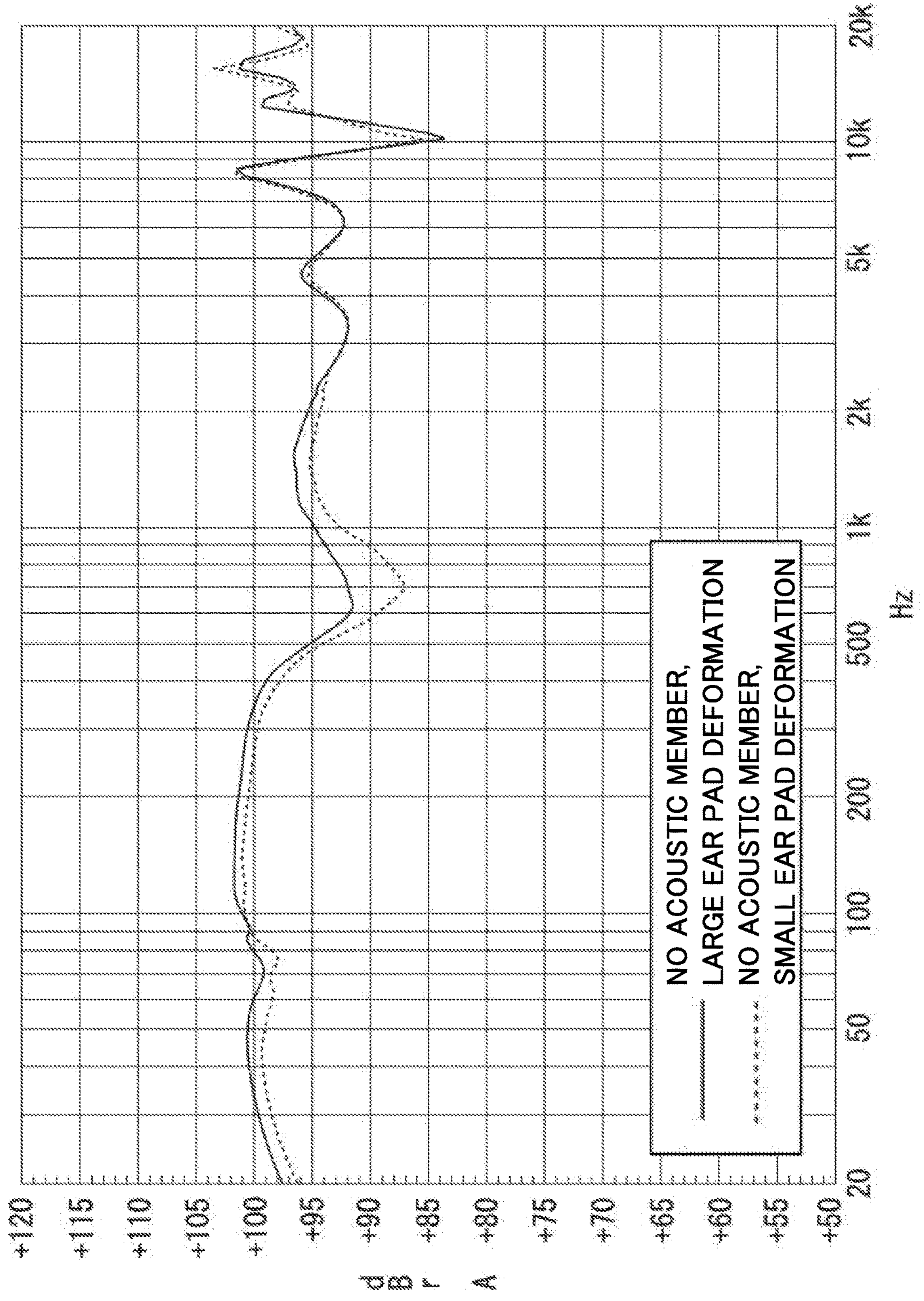
FIG. 10 shows frequency characteristics of a headphone of a comparative example.

FIG. 10 shows frequency characteristics of a headphone of a comparative example. In FIG. 10, the solid line indicates acoustic characteristics when the ear cup 1100 in which the acoustic member 50 is not provided is pressed against the user's temporal region with relatively high lateral pressure. The broken line indicates acoustic characteristics when the ear cup 1100 in which the acoustic member 50 is not provided is pressed against the user's temporal region with relatively low lateral pressure.

The acoustic characteristics of FIGS. 9 and 10 are compared. Sound pressure difference between (i) when the ear pad 30 and the ear pad 1030 are deformed greatly and (ii) when the ear pad 30 and the ear pad 1030 are deformed slightly is about 2 dB at around 1 kHz in both the ear cup 100 and the ear cup 1100. However, at a frequency equal to or below 500 Hz, the ear cup 100 according to the present embodiment shows a smaller difference in acoustic characteristics caused by the deformation of the ear pad 30 than that of the comparative example. As such, according to the configuration of the present embodiment, the difference in the acoustic characteristics caused by the deformation of the ear pad 30 is less likely to occur, and the headphone structure 1 is improved.

Specifically, the difference in the sound pressure between when the ear pad 30 is deformed greatly and when the ear pad 30 is deformed slightly is about 1.5 dB at around 50 Hz in the acoustic characteristics (FIG. 10) of the ear cup 1100 without the acoustic member 50. On the other hand, in the acoustic characteristics (FIG. 9) of the ear cup 100 with the acoustic member 50, the difference in the sound pressure between when the ear pad 30 is deformed greatly and when the ear pad 30 is deformed slightly is about 0.3 dB around 50 Hz. This confirmed that the acoustic member 50 can reduce the change in the acoustic characteristics due to the deformation of the ear pad 30.

It is confirmed that applying the acoustic member 50 to the ear cup 100 as in the present embodiment can reduce the individual difference (i.e., a difference in the sound characteristics that occurs according to the body shape of the user who wears the headphone structure 1) caused by the compression of the ear pad 30.

Further, in the acoustic characteristics (FIG. 9) of the ear cup 100 with the acoustic member 50, a difference between the sound pressure indicated by the solid line and the sound pressure indicated by the broken line is small at low frequencies equal to or below about 500 Hz. Therefore, it is confirmed that the change in acoustic characteristics caused by deformation of the ear pad 30 is unlikely to occur in the ear cup 100.

Figure 11:
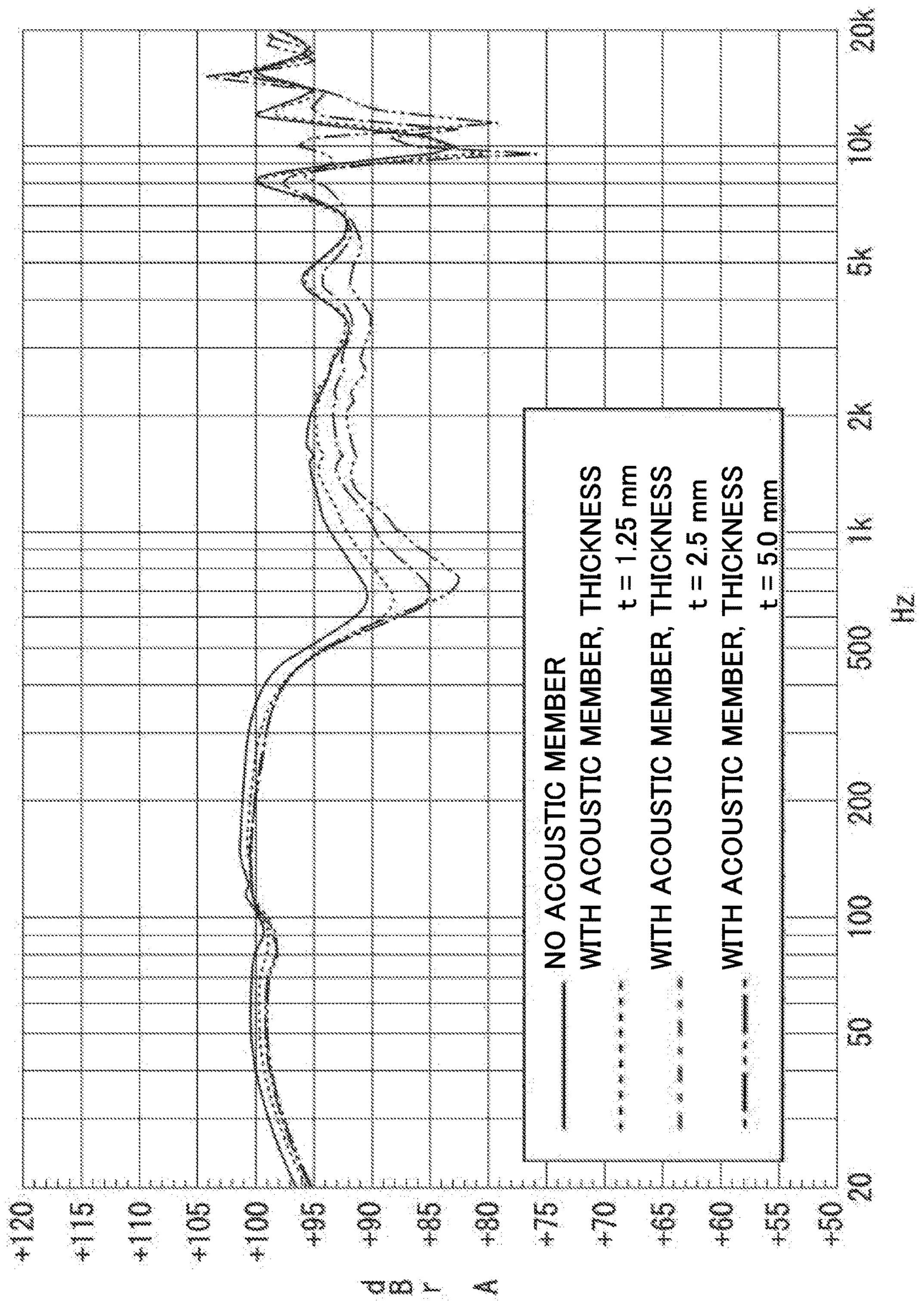
FIG. 11 shows acoustic characteristics of an ear cup having no acoustic member, and acoustic characteristics of a plurality of ear cups having acoustic members of different thicknesses.

FIG. 11 shows the acoustic characteristics of the ear cup 1100 in which the acoustic member 50 is not provided, and acoustic characteristics of a plurality of ear cups 100 having acoustic members 50 of different thicknesses. The results shown in FIG. 11 are examples of measurement results of acoustic characteristics under parameters such as (i) the presence or absence of the acoustic member 50 and (ii) the thickness of the acoustic member 50. The solid line indicates acoustic characteristics of the ear cup 1100 without an acoustic member. The broken line indicates acoustic characteristics of the ear cup 100 provided with the acoustic member 50 having a thickness t=1.25 mm. The dash-dot line indicates acoustic characteristics of the ear cup 100 provided with the acoustic member 50 having the thickness t=2.5 mm. The dash-dot-dot line indicates acoustic characteristics of the ear cup 100 provided with the acoustic member 50 having the thickness t=5.0 mm.

Around 1 kHz, a sound pressure difference of about 1.5 dB is observed in the acoustic member 50 having the thickness t=1.25 mm compared with the ear cup 1100 without the acoustic material. In the acoustic member 50 having the thickness t=2.5 mm, a sound pressure difference of about 4 dB is observed compared with the ear cup 1100 without the acoustic member. In the acoustic member 50 having the thickness t=5.0 mm, a sound pressure difference of about 6 dB is observed compared with the ear cup 1100 without the acoustic member.

Users or manufacturers of the headphone structure 1 can change the acoustic characteristics of the ear cup 100 by changing the thickness of the acoustic member 50 since the acoustic characteristics of the ear cup 100 change depending on the thickness of the acoustic member 50 as above. The user or the manufacturer can change the acoustic characteristics of the ear cup 100 by replacing a first acoustic member 50 in the ear cup 100 with a second acoustic member 50 having a different thickness, or stacking another acoustic member 50 having the same thickness as the first acoustic member 50 on the first acoustic member 50, for example.

[Effect of the Headphone Structure 1]

As described above, the headphone structure 1 includes the baffle plate 20 that has the acoustic holes **25*h* through which the sound generated by the driver unit 10 passes, the acoustic member 50 disposed on the closer side to the outer edge of the baffle plate 20 than the acoustic holes 25*h* in the baffle plate 20, and the ear pad 30 disposed on the surface of the acoustic member 50 opposite to the surface that contacts the baffle plate 20. Since the headphone structure 1 is configured in this manner, the change in the acoustic characteristics of the headphone structure 1 due to the ear pad 30 being pressed is suppressed, and therefore the headphone structure 1 can realize stable acoustic characteristics regardless of a wearing state of the headphone structure 1** by the user.

The present invention is explained on the basis of the exemplary embodiments. The technical scope of the present invention is not limited to the scope explained in the above embodiments and it is possible to make various changes and modifications within the scope of the invention. Further, new exemplary embodiments generated by arbitrary combinations of them are included in the exemplary embodiments of the present invention. The effect of the new embodiment caused by the combination has the effect of the original embodiment together.

What is claimed is:

1. A headphone structure comprising:

a driver unit;

a baffle plate that holds the driver unit, has an outer edge and has a plurality of acoustic holes through which a sound generated by the driver unit passes, wherein the acoustic holes exist at respective positions spaced inward from the outer edge, within a region of the baffle plate, and the region having a diameter;

an acoustic member having a first surface and a second surface opposite the first surface, wherein the acoustic member has an annular shape with an inner diameter larger than the diameter of the region of the baffle plate wherein the acoustic holes exist and is disposed on the baffle plate in an arrangement wherein the first surface contacts a surface area of the baffle plate outside the region of the baffle plate wherein the acoustic holes exist and an inner edge of the annular shape surrounds and is outside said region of the baffle plate; and an ear pad disposed on the second surface of the acoustic member that contacts the baffle plate.

2. The headphone structure according to claim 1, wherein the acoustic member has a thickness between the first surface and the second surface, wherein the thickness is configured such that the ear pad does not close the acoustic holes in a state in which the headphone structure is worn by a user and the ear pad is compressed in a thickness direction by being pushed toward the acoustic hole.

3. The headphone structure according to claim 1, wherein the acoustic member is formed of a material having air permeability.

4. The headphone structure according to claim 1, wherein the ear pad is an annular member having a portion that contacts the second surface of the acoustic member.

5. A headphone structure comprising:

a driver unit;

a baffle plate that holds the driver unit and has an acoustic hole through which a sound generated by the driver unit passes;

an acoustic member disposed at a position closer to an outer edge of the baffle plate than the acoustic hole in the baffle plate; and an ear pad disposed on a surface of the acoustic member opposite to a surface that contacts the baffle plate, wherein the ear pad includes an extending part that has elasticity, and the ear pad is detachably fixed to the baffle plate in a state that the extending part engages with a part of the baffle plate or a part of a housing that holds the baffle plate.

6. The headphone structure according to claim 5, wherein the acoustic member is detachably disposed on the baffle plate, and the extending part of the ear pad expands or contracts according to a thickness of the acoustic member.

7. A headphone structure comprising:

a driver unit;

a baffle plate that holds the driver unit and has an acoustic hole through which a sound generated by the driver unit passes;

an acoustic member disposed at a position closer to an outer edge of the baffle plate than the acoustic hole in the baffle plate; and an ear pad disposed on a surface of the acoustic member opposite to a surface that contacts the baffle plate, wherein a thickness of a portion of the acoustic member on a back side of the user is smaller than a thickness of a portion of the acoustic member on a front side of the user when the headphone structure is worn by the user, or a thickness of a portion of the acoustic member on a back side of the user is greater than a thickness of a portion of the acoustic member on a front side of the user when the headphone structure is worn by the user.

8. The headphone structure according to claim 1, wherein the region of the baffle plate wherein the acoustic holes, the diameter of the region, a configuration of the outer edge of the baffle plate, the respective positions of the acoustic holes, and respective shapes of the acoustic holes are mutually arranged in a manner such that surface area of the baffle plate outside the region of the baffle plate is an annular surface area.

9. The headphone structure according to claim 1, wherein the acoustic holes are aligned at respective positions along a reference circle extending in a circumferential direction within the outer edge of the baffle plate.

10. The headphone structure according to claim 9, wherein the respective positions of the acoustic holes are arranged at mutually equal intervals along the reference circle.

11. The headphone structure according to claim 1, wherein the acoustic member has a ring shape.

* * * * *